United States Patent Office 2,865,871
Patented Dec. 23, 1958

2,865,871
OIL IN WATER EMULSION TEXTILE PRINTING PASTE AND PREPARATION

Joyce L. Johnson, Fair Lawn, Arthur Booth, Little Falls, and Ernest Messmer, Fair Lawn, N. J., assignors to Interchemical Corporation, New York, N. Y., a corporation of Ohio No Drawing. Application March 16, 1954
Serial No. 416,689
4 Claims. (Cl. 260—15)

This invention relates to the decoration of textiles. More specifically it aims to provide improved pigmented composition for coloring textiles, especially pigment printing of textiles.

In prior art practices, the most successful means of printing on textiles using pigment as the coloring material has been to use pigmented water-in-oil emulsions in which the oil phase comprises a volatile, water-immiscible organic solvent solution of a thermosetting resin, usually a melamine-formaldehyde or a urea-formaldehyde resin, which when heated to thermoset the resin binds the pigment to the textile, e. g. U. S. Patents Nos. 2,222,581-2.

One of the principal objections to pigmented water-in-oil emulsions has been that due to the fact that because the oil phase is the outside phase of the emulsion, it is necessary to use organic solvents to clean up the printing machinery after a run has been made. In view of this objection, the industry has long desired a pigment printing system in which the printing machinery can be cleaned with water. The present invention aims to provide such a system by providing a pigmented emulsion printing paste in which the aqueous phase is the outside phase of the emulsion. As an additional advantage, the invention provides better color value in some instances than is obtained with pigmented water-in-lacquer emulsions.

We are aware that numerous attempts have been made to print or dye textiles with pigmented oil-in-water emulsion. For instance, Patent 2,310,795 proposes to print textiles with a pigmented oil-in-water emulsion containing protein, urea and melamine-formaldehyde dissolved in the aqueous phase and containing hydrocarbon solvent as the oil phase. Patents 2,317,359 and 2,335,484 suggest using pigmented oil-in-water emulsions containing alkyd resin and urea-formaldehyde resin in the oil phase. Patent 2,334,199 proposes to dye textiles with thin pigmented oil-in-water emulsions containing water-insoluble resin dissolved in the oil phase. Patent 2,338,252 discloses the use of polyvinyl alcohol in the aqueous phase and water-soluble thermosetting resin in the aqueous phase or in the oil phase of a pigmented oil-in-water emulsion containing a volatile amine to inhibit gelation. Patent No. 2,601,661 discloses pigmented oil-in-water emulsions containing water-soluble thermosetting resin and methyl cellulose. Numerous other patents mention pigmented oil-in-water emulsions for decorating textiles. Many of these patents, although they may involve improvements over prior practices are merely indicative of unfruitful attempts to employ pigmented oil-in-water emulsions for printing on textiles, while in other patents, the pigmented oil-in-water emulsions disclosed are relatively thin and are designed especially for pigment dyeing of textiles.

The pigmented oil-in-water emulsions of the present invention are of printing consistency and comprise as essential ingredients: pigment, water-insoluble, volatile, volatile organic solvent, water-soluble thickening agent, organic solvent soluble thermosetting resin, organic solvent soluble ethyl cellulose, water and an anionic dispersing agent other than soap, and a soap formed from a fatty oil acid and a water-soluble volatile base. Auxiliary ingredients, but non-essential to the invention in its broadest scope, include a latex of linear polymeric material, such as natural rubber, synthetic rubber, and acrylate polymers and organic solvent soluble oil modified alkyds.

The ratio of oil phase to aqueous phase is not particularly critical and may vary from 0.5 to 80% oil phase to 99.5 to 20% aqueous phase.

The amount of pigment used will vary with the particular pigment and the depth of shade desired. For instance up to 25 or 30% of a white pigment is often used in order to obtain the desired effect, while up to about 8% of carbon black is usually sufficient to give the desired color, and with other color pigments, it usually is necessary to use up to about 5% of the pigment to obtain the deepest shade desired.

Thermosetting resins that are operable in the invention include organic solvent soluble thermosetting melamine-formaldehyde and urea-formaldehyde resin. The amount of thermosetting resin must be from 0.25 to 1.5 parts for each part of pigment to insure adequate binding of the pigment to the textile.

Ethyl cellulose, another essential ingredient in the oil phase of the emulsion, is used in order to obtain good emulsion stability and good color value in the printed textile. All of the organic solvent soluble ethyl celluloses containing 44 to 50% ethoxy can be used. The amount of ethyl cellulose required is from 0.15 to 4 parts for each part of thermosetting resin.

The water-soluble thickening agent is preferably methyl cellulose having a viscosity of 1200 to 9000 centipoises as measured on a 2% aqueous solution at 25° C. Other water-soluble thickeners that are operable, but less preferred, include hydroxy ethyl cellulose, polyvinyl alcohol, ammonium, sodium or potassium polyacrylate or polymethacrylate, styrene-maleic anhydride copolymers, and copolymers of polyvinyl methyl ether and maleic anhydride. The amount of thickener required will be from 0.1 to 10%, based on total emulsion, the particular amount used depending upon the particular thickener used and the amount of aqueous phase present in the emulsion printing paste. For instance, using methyl cellulose as the preferred thickener, the amount of thickener required is usually not more than about 1% and in emulsions containing a low percentage of aqueous phase, as low as 0.1% may be used. It should also be noted that the higher the viscosity grade of methyl cellulose used the lesser is the amount required.

A very essential component of the emulsion printing paste of the present invention is the dispersing agent used. This dispersing agent is actually a combination of two dispersing agents: (1) an anionic dispersing agent other than soap and (2) a soap formed in situ between a fatty oil acid and a water-soluble volatile base. The anionic dispersing agent other than soap is used in amounts up to 5% of the total print paste and is preferably a sodium alkyl sulfate such as sodium lauryl sulfate. Other operable anionic dispersing agents include: dioctyl sodium, sulfo succinate, and Santomerse D (sodium salt of alkyd substituted aryl sulfonates).

The soap formed in situ results from the reaction of up to 3% of a fatty acid, such as lauric acid, myristic acid, oleic acid or stearic acid, with at least one molecular equivalent of a water-soluble volatile base, i e. ammonia or a volatile, water-soluble amine, such as methyl amine, di-methyl amine, trimethyl amine, ethyl amine, morpholine and the like. The soap is preferably formed in situ, by reacting the base with the fatty oil acid in the concentrate pigment dispersion or the clear printing vehicle. The preferred fatty oil acid is stearic acid or oleic acid.

When it is desirable to improve the washfastness of the printed textile an oil modified alkyd resin is added to the oil phase of the emulsion in amounts ranging up to about 2%, based on the total weight of print paste. Typical alkyds resin that can be used include glycerol-phthalate alkyds modified with 40 to 75% of a fatty oil or a fatty oil acid.

When it is desired that the printed textile be crock resistant, a water-insoluble linear resin or polymer which is insoluble in the oil phase can be incorporated into the aqueous phase of the emulsion. For this purpose a synthetic linear polymer, such as a polyacrylate, a synthetic rubber, or natural rubber is preferred. Amounts up to 15% of the total print paste can be used. Advantageously, this anti-crocking agent is added as a latex, i. e. a dispersion of the polymer in water, either during the formation of the paste or added after the print paste has been made.

The volatile, water-immiscible organic solvent used in the print pastes of the invention consists predominantly of hydrocarbon solvents that are readily vaporizable at temperatures on the order of 200 to 250° F., and preferably consists of such solvents that are composed predominantly of aliphatic hydrocarbons and containing only minor amounts of aromatic and terpenic type hydrocarbons.

In the practice of the invention, the pigmented oil-in-water printing pastes are preferably prepared by mixing the desired amount of a concentrated pigmented oil-in-water emulsion or color concentrate, with a clear, or unpigmented oil-in-water emulsion printing vehicle. The essential components of the color concentrate are pigment, solvent, water, ethyl cellulose, thermosetting resin, fatty oil acid, preferably stearic acid, ammonia or a water-soluble amine, and an anionic dispersing agent other than soap. The essential ingredients in the clear, or unpigmented oil-in-water emulsion printing vehicle are: solvent, thermosetting resin, oleic acid or other liquid fatty oil acid, water-ammonia, and thickening agent, preferably methyl cellulose of 1200 to 9000 cps. viscosity in 2% aqueous solution at 25° C.

Typical oil-in-water emulsion color concentrates for use in the invention are as follows:

A. Blue color concentrate: Parts
Phthalocyanine blue _____ 9.0
Butylated melamine-formaldehyde resin as 50% solution in equal parts xylol and butanol, e. g. Melmac 245–8 _____ 18.00
Stearic acid _____ 2.70
Ethyl cellulose, G-type 45% ethoxy _____ 3.60
Methyl cellulose, 4000 cps. grade _____ 0.20
Sodium lauryl sulfate _____ 2.70
NH$_4$OH (28%) _____ 2.70
40% latex of a copolymer of 45% acrylonitrile and 55% butadiene _____ 11.25
Pine oil _____ 2.20
Turpentine _____ 7.4
Water _____ 40.25
                                                   100.00

B. Black color concentrate:
Carbon black _____ 18.00
Butylated melamine-formaldehyde resin (same as in A above) _____ 10.10
Stearic acid _____ 1.55
Ethyl cellulose, G-type, 45% ethoxy _____ 1.80
Methyl cellulose, 4000 cps. grade _____ 0.18
Sodium lauryl sulfate _____ 1.55
NH$_4$OH (28%) _____ 1.55
Triethanol amine _____ 1.55
40% latex (same as in A above) _____ 22.50
Turpentine _____ 11.50
Water _____ 29.72

C. Red color concentrate:
Azo pigment (made by coupling the 2,5-dimethoxy-5-chloranilide of β-oxy-naphthoic acid with 2-methoxy-5-sulfondiethyl aniline) _____ 9.00
Ethyl cellulose, G-type, 45% ethoxy _____ 3.60
60% solution of butylated melamine-formaldehyde resin in xylol _____ 15.00
Stearic acid _____ 2.70
Sodium lauryl sulfate _____ 2.70
Methyl cellulose, 4000 cps. grade _____ 0.30
NH$_4$OH (28%) _____ 2.70
40% latex (as in A above) _____ 11.25
Pine oil _____ 5.00
Turpentine _____ 9.00
Water _____ 35.75

D. White color concentrate:
Titanium dioxide _____ 37.0
Butylated melamine-formaldehyde resin (as in A above) _____ 18.4
Stearic acid _____ 1.8
Ethyl cellulose, T-type, 45% ethoxy _____ 3.7
Methyl cellulose, 4000 cps. grade _____ 0.2
Sodium lauryl sulfate _____ 1.8
Triton X–100 _____ 2.8
NH$_4$OH (28%) _____ 1.8
Water _____ 15.9
Organic solvent _____ 16.6

E. Yellow color concentrate:
Butylated melamine-formaldehyde resin 60% solution in xylol _____ 16.00
Ethyl cellulose, N–10 grade _____ 3.00
Stearic acid _____ 3.00
Turpentine _____ 13.00
28% NH$_4$OH _____ 4.00
Benzidine yellow pigment _____ 10.00
Sodium lauryl sulfate _____ 3.00
Water _____ 35.50
Latex (as in A above) _____ 12.50

The above colors can be mixed in conventional manner to give oil-in-water emulsions. The ethyl cellulose is preferably added in the form of a previously prepared solution in turpentine, xylol, or a mixture of one or both of these, and small amount of octyl alcohol. The stearic acid will, of course, be dissolved in the organic, or oil phase prior to emulsifying this with the aqueous phase containing the ammonia or water-soluble mine. The pigment may be in either phase of the emulsion e. g. it may be previously dispersed in oil phase before adding or forming the emulsion or it may be dispersed in the aqueous phase prior to formation of the emulsion.

The following examples illustrate typical pigmented oil-in-water emulsion printing pastes:

*Example 1*

22.2 parts of red color concentrate (as in C above) with 77.8 parts of a clear oil-in-water printing vehicle made from ingredients consisting of:

Sodium lauryl sulfate _____ 0.03
Alkyd resin solution (50% solution of a 70% drying oil modified phthalic glyceride alkyd in xylol) _____ 0.78
Butylated melamine-formaldehyde resin (60% solution in xylol) _____ 0.62
Oleic acid _____ 0.53
Methyl cellulose, 4000 cps. grade _____ 0.47
NH$_4$OH 28% _____ 0.23
Petroleum hydrocarbon solvent, boiling range 306–394° F., kauri-butanol value 33–45, e. g. Varsol #2 _____ 27.00
Water _____ 48.14 gives a print paste containing 2% red pigment, about

1% latex (solids), 0.39% alkyd resin, about 2.4% melamine resin binder, 0.8% ethyl cellulose and about 58% water.

*Example 2*

11–1 parts of black color concentrate (as in B above) and 89.9 parts of a clear printing vehicle (same as in Example 1 above), give a print paste containing 2% pigment 0.2% ethyl cellulose, 1% latex (solids), 0.92% melamine resin binder, and 0.45% alkyd resin.

*Example 3*

22.2 parts blue color concentrate (as in A above) and 77.8 parts of an oil-in-water printing vehicle consisting of:

| | |
|---|---|
| Sodium lauryl sulfate | 0.03 |
| Alkyd resin (50% xylol solution of a 70% drying oil modified phthalic glyceride alkyd) | 0.78 |
| Oleic acid | 0.53 |
| Methyl cellulose, 4000 cps. grade | 0.47 |
| NH$_4$OH (28%) | 0.23 |
| Varsol #2 | 27.00 |
| Water | 48.76 | gives a print paste containing 2% pigment, 2% melamine resin binder, 1% latex solids, 0.8% ethyl cellulose, about 0.4% alkyd resin, and about 51% water.

*Example 4*

4.45 parts of blue color concentrate (as A above) and 95.55 parts of clear oil-in-water emulsion printing vehicle consisting of:

| | |
|---|---|
| Sodium lauryl sulfate | 0.04 |
| 40% latex of a copolymer of 45% acrylonitrile and 55% butadiene | 5.80 |
| Alkyd resin solution (as in Example 3) | 0.97 |
| Butylated melamine-formaldehyde resin (60% solution xylol) | 0.76 |
| Oleic acid | 0.65 |
| Methyl cellulose, 4000 cps. type | .57 |
| NH$_4$OH (28%) | .28 |
| Varsol #2 | 33.30 |
| Water | 53.18 | gives a print paste containing 0.4% pigment, 6% latex solids, about 0.5% alkyd resin, about 0.16% ethyl cellulose, about 1% melamine resin binder and about 55.5% water.

We claim:

1. A pigment printing paste consisting of pigment dispersed in an oil-in-water emulsion comprising water, a latex of a synthetic rubber formed by copolymerization of approximately equal parts of butadiene and acrylonitrile, methyl cellulose which has a viscosity of between 1200 and 9000 centipoises as measured on a 2% aqueous solution at 25° C., a volatile water-immiscible organic solvent, an organic solvent-soluble thermosetting resin selected from the class consisting of melamine-formaldehyde resins and urea-formaldehyde resins, an organic solvent-soluble ethyl cellulose, sodium lauryl sulfate, and a soap formed in situ by neutralization, with ammonia, of fatty oil acids, at least about half of said fatty oil acids being liquid at room temperature, the ratio of water to organic solvent in said paste varying from about 200 to about 0.25, said thermosetting resin being present in an amount equal to from about 0.25 part to about 1.5 parts per part of pigment, said ethyl cellulose being present in an amount equal to from about 0.15 to about 4.0 parts per part of said thermosetting resin, said methyl cellulose being present in an amount equal to between about 0.1% and 1.0% of the total weight of the printing paste, said sodium lauryl sulfate being present in amount not execeeding 5% based on the weight of said printing paste, and said in situ of formed soap being formed by neutralization of fatty acids which total more than 3% of the total print paste.

2. The method of preparing a pigmented oil-in-water textile printing paste which consists in mixing one part of a concentrated pigment dispersion with from 0.25 to 200 parts of a printing emulsion vehicle; said concentrated pigment dispersion comprising 5 to 50% pigment dispersed in 95 to 50% of a carrier comprising water, a soap of a fatty oil acid and ammonia, sodium lauryl sulfate, and at least 35% of a water-immiscible organic solvent solution of ethyl cellulose and an organic solvent-soluble thermosetting resin from the group consisting of melamine-formaldehyde and urea formaldehyde resins, said thermosetting resin being present in an amount equal to from 0.25 to 1.5 parts per part of pigment, said ethyl cellulose being present in an amount equal to 0.15 to 4.0 parts per part of said thermosetting resin, and said soap being formed by neutralization in situ of an amount of said fatty oil acid not exceeding 0.4 part per part of pigment with said ammonia, and said sodium lauryl sulfate being present in an amount not exceeding about 1½ times the amount of said fatty oil acid; said printing emulsion vehicle consisting of an oil-in-water emulsion formed by emulsifying from 75 to 30 parts of a volatile, water-immiscible organic solvent solution of a liquid fatty acid into from 25 to 70 parts of an aqueous solution having dissolved therein sufficient ammonia to neutralize said liquid fatty acid and from 0.6% to 6.0% by weight of this solution of a methyl cellulose having a viscosity of between 1200 and 9000 centipoises as measured in a 2% aqueous solution at 25° C., said liquid fatty acid being employed in an amount equal to about 1–1½% of the water content of said printing emulsion vehicle.

3. A method as in claim 2 where the aqueous phase of the concentrated color dispersion contains synthetic rubber latex in an amount not exceeding one part of latex solids for each part of pigment, said synthetic rubber latex being formed by copolymerization of approximately equal parts of butadiene and acrylonitrile.

4. A method as in claim 2 where the aqueous phase of pigment dispersion contains water-soluble methyl cellulose in amounts not exceeding 0.05 part for each part of pigment.

References Cited in the file of this patent

UNITED STATES PATENTS

| | | |
|---|---|---|
| 2,346,041 | Morgan et al. | Apr. 4, 1944 |
| 2,383,937 | Kienle et al. | Sept. 4, 1945 |
| 2,385,737 | Smith | Sept. 25, 1945 |
| 2,601,661 | Kienle et al. | June 24, 1952 |
| 2,631,985 | Mullin | Mar. 17, 1953 |
| 2,637,705 | Auer | May 5, 1953 |
| 2,637,711 | Auer | May 5, 1953 |